(12) United States Patent
Li

(10) Patent No.: US 7,991,384 B2
(45) Date of Patent: Aug. 2, 2011

(54) METHOD FOR CHARGING MULTIMEDIA MESSAGE SERVICE

(75) Inventor: Dawei Li, Guangdong (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 667 days.

(21) Appl. No.: 11/596,764

(22) PCT Filed: May 24, 2005

(86) PCT No.: PCT/CN2005/000722
§ 371 (c)(1),
(2), (4) Date: Aug. 4, 2008

(87) PCT Pub. No.: WO2005/117338
PCT Pub. Date: Dec. 8, 2005

(65) Prior Publication Data
US 2009/0011737 A1    Jan. 8, 2009

(30) Foreign Application Priority Data
May 26, 2004 (CN) .......................... 2004 1 0042834

(51) Int. Cl.
*H04M 11/00* (2006.01)
(52) U.S. Cl. ......... 455/406; 455/466; 455/436; 455/461
(58) Field of Classification Search .................. 455/406, 455/466, 436, 461
See application file for complete search history.

(56) References Cited

U.S. PATENT DOCUMENTS

| 2007/0191011 A1* | 8/2007 | Jiang .............................. 455/436 |
| 2007/0213075 A1* | 9/2007 | Jiang .............................. 455/461 |
| 2008/0133703 A1* | 6/2008 | Myllynen et al. ............. 709/217 |
| 2009/0111433 A1* | 4/2009 | Muhonen et al. .......... 455/414.1 |

FOREIGN PATENT DOCUMENTS

| CN | 1387342 A | 12/2002 |
| CN | 100397819 C | 12/2005 |
| GB | 2391340 A * | 2/2004 |
| JP | 2004-86493 | 3/2004 |
| KR | 2003-0097243 | 12/2003 |
| WO | WO 03/058991 A2 | 7/2003 |
| WO | WO 2004/015995 A2 | 2/2004 |

OTHER PUBLICATIONS

"Digital cellular telecommunications system (Phase 2+) TS 23.140", ETSI Standards, European Telecommunications Standards Institute, Sophia-Antido, FR, vol. 3-T2, No. V5100, Mar. 2004, XP014016475, ISSN: 0000-0001.

(Continued)

*Primary Examiner* — David Q Nguyen

(57) ABSTRACT

The present invention discloses a method for charging Multimedia Message Service (MMS), where a corresponding relationship between a Mobile Station International ISDN Number (MSISDN) of a receiver and a Recipient Multimedia Message Service Center (Recipient-MMSC) that sends an MMS to the receiver is set in an adjacent Wireless Application Protocol Gateway (WAP-GW) which the receiver accesses. The method includes: upon the receipt of the MMS, the receiver sends an MMS receipt confirmation including the MSISDN of the receiver to the adjacent WAP-GW which the receiver accesses; the adjacent WAP-GW which the receiver accesses determines the Recipient-MMSC that corresponds to the MSISDN of the receiver contained in the confirmation according to the set corresponding relationship, and sends the confirmation to the Recipient-MMSC; and the Recipient-MMSC triggers the charging mechanism and takes the receipt of the confirmation as a charging point for charging.

22 Claims, 2 Drawing Sheets

OTHER PUBLICATIONS

"Universal Mobile Telecommunications System (UMTS) TS 132 235". ETSO Standards, European Telecommunications Standards Institute, Sophia-Antido, FR, vo. 3-SA5, No. V540, Sep. 2003, XP014017482, ISSN: 0000-0001.

Wireless Application Protocol Forum: "Wireless Application Protocol Wireless Transaction Protocol Specification" WAP WTP, [Online] Apr. 30, 1998, pp. 1-71, XP002444712.

Communication pursuant to Article 96(2) EPC dated Nov. 23, 2007 in connection with European Patent Application No. EP 05 745 436.5.

Examination Report dated Feb. 26, 2009 in connection with India Patent Application No. 4369/CHENP/2006.

Written Opinion of the International Searching Authority dated Sep. 1, 2005 in connection with International Patent Application No. PCT/CN2005/000722.

\* cited by examiner

METHOD FOR CHARGING MULTIMEDIA MESSAGE SERVICE

FIELD OF THE INVENTION

The present invention relates to the technology for handling Multimedia Message Service (MMS), and more specifically to a method for charging MMS.

BACKGROUND OF THE INVENTION

MMS is a mobile data service on 2 G, 2.5 G or 3 G mobile network, featuring much more complex service flow than that of Short Message Service (SMS). The greatest difference between MMS and SMS is that, in an SMS system, an SMS is pushed directly from a sender to a receiver, while in an MMS system, an address at which an MMS is saved is pushed to a receiver before the receiver initiatively downloads the MMS according to the address received.

At present when receiving an MMS, a receiver may adopt a method of delaying or performing immediately the receipt of the MMS. FIG. 1 shows the flow chart of a method for delaying the receipt of the MMS by the receiver in the related art. As shown in FIG. 1, the system that implements the transmission of an MMS includes a sender, an adjacent Short Message Service Center (SMSC) which the sender accesses, an adjacent Wireless Application Protocol Gateway (WAP-GW) which the sender accesses, an Originator Multimedia Message Service Center (Originator-MMSC), a Recipient Multimedia Message Service Center (Recipient-MMSC), an adjacent WAP-GW which the receiver accesses and an adjacent SMSC which the receiver accesses. The transmission of an MMS includes:

Step 100: the sender transmits an MMS transparently to the Originator-MMSC through the adjacent WAP-GW which the sender accesses, where the MMS contains a Mobile Station International ISDN Number (MSISDN) of the receiver;

Step 101: upon the receipt of the MMS, the Originator-MMSC transmits an MMS receipt confirmation transparently to the sender through the adjacent WAP-GW which the sender accesses;

Step 102: the Originator-MMSC determines the Recipient-MMSC according to the MSISDN of the receiver contained in the MMS and forwards the MMS which contains the MSISDN of the receiver to the determined Recipient-MMSC;

Step 103: upon the receipt of the MMS, the Recipient-MMSC sends an MMS receipt confirmation to the Originator-MMSC;

Step 104: the Recipient-MMSC stores the MMS, determines the adjacent SMSC which the receiver accesses and the receiver according to the MSISDN of the receiver contained in the MMS, and transmits an MMS notification transparently to the adjacent SMSC which the receiver accesses through the adjacent WAP-GW which the receiver accesses; the MMS notification contains the address of the Recipient-MMSC which stores the MMS;

Step 105: upon the receipt of the MMS notification, the adjacent SMSC which the receiver accesses returns a response indicating the receipt of the MMS notification through the adjacent WAP-GW which the receiver accesses to the Recipient-MMSC at the address of the Recipient-MMSC contained in the MMS notification;

Step 106: the SMSC which the receiver accesses sends the MMS notification which contains the Recipient-MMSC address that stores the MMS to the receiver;

Step 107: upon the receipt of the MMS notification, the receiver returns a response indicating the receipt of the MMS notification to the adjacent SMSC which the receiver accesses;

Step 108: when the receiver wants to obtain the MMS, the receiver determines the Recipient-MMSC that stores the MMS according to the Recipient-MMSC address contained in the MMS notification, and transmits a request for obtaining the MMS transparently through the adjacent WAP-GW which the receiver accesses;

Step 109: upon the receipt of the request, the Recipient-MMSC transmits the MMS stored transparently to the receiver through the adjacent WAP-GW which the receiver accesses;

Step 110: the receiver transmits an MMS receipt confirmation, i.e. an M-Ackowledge.ind message transparently to the Recipient-MMSC at the Recipient-MMSC address set by the receiver itself through the adjacent WAP-GW which the receiver accesses;

Step 111: upon the receipt of the confirmation, the Recipient-MMSC at the Recipient-MMSC address set by the receiver itself judges whether the MMS is transmitted successfully according to the content of the confirmation and sends a delivery report describing the MMS delivery status to the Originator-MMSC;

Step 112: the Originator-MMSC returns a response to the Recipient-MMSC indicating the receipt of the delivery report;

Step 113: the Originator-MMSC sends the delivery report obtained to the adjacent WAP-GW which the sender accesses;

Step 114: the adjacent WAP-GW which the sender accesses returns a response to the Originator-MMSC indicating the receipt of the delivery report;

Step 115: the adjacent WAP-GW which the sender accesses forwards the delivery report obtained to the adjacent SMSC which the sender accesses;

Step 116: the adjacent SMSC which the sender accesses returns a response to the adjacent WAP-GW which the sender accesses indicating the receipt of the delivery report;

Step 117: the adjacent SMSC which the sender accesses forwards the delivery report obtained to the sender;

Step 118: the sender returns a response to the adjacent SMSC which the sender accesses indicating the receipt of the delivery report.

The adjacent WAP-GW which the sender accesses and the adjacent WAP-GW which the receiver accesses are transparent transmission devices that do not modify or explain the messages they forward.

Usually the Recipient-MMSC at the Recipient-MMSC address set by the receiver and the Recipient-MMSC that sends the MMS to the receiver are the same Recipient-MMSC.

If the receiver obtains the MMS immediately upon the receipt of the MMS notification rather than delays the receipt of the MMS, Step 107 above will not be necessary, the adjacent SMSC which the receiver accesses, upon the receipt of the notification, forwards the MMS notification directly to the receiver, and then the receiver, upon the receipt of the notification, transmits a request for obtaining the MMS transparently to the Recipient-MMSC through the adjacent WAP-GW which the receiver accesses, and then Step 109 to Step 117 are performed, where the confirmation sent by the receiver indicating the receipt of the MMS in Step 110 is an M-NotifyResp.ind message.

When the receiver receives the MMS, an MMS provider charges the sender according to whether the receiver receives the MMS successfully; in other words, if the MMS is received successfully, the sender will be charged; otherwise the sender will not be charged.

Currently no international standards or criteria specify a mechanism for MMS charging, and different MMS providers often adopt different mechanisms for charging. There are two commonly used trigger mechanisms for MMS charging. In the first trigger mechanism the MMS provider takes the sending of the confirmation by the Originator-MMSC indicating the receipt of the MMS in Step 101 as a trigger point for charging, the Originator-MMSC generates a charging data record (CDR) and the sender is charged according to the CDR; in the second trigger mechanism the MMS provider takes the receiving of the MMS receipt confirmation by Recipient-MMSC in Step 110 as a trigger point for charging, both the Recipient-MMSC and Originator-MMSC generate CDRs and the sender is charged according to the CDRs.

SUMMARY OF THE INVENTION

An embodiment of the present invention provides a method for charging Multimedia Message Service (MMS)

A method for charging MMS includes:

sending, by a receiver, an MMS receipt confirmation containing a Mobile Station International Integrated Services Digital Network Number (MSISDN) of the receiver to an adjacent Wireless Application Protocol Gateway (WAP-GW) which the receiver accesses upon the receipt of the MMS;

determining, by the adjacent WAP-GW which the receiver accesses, a Recipient Multimedia Message Service Center (Recipient-MMSC) that corressponds to the MSISDN of the receiver contained in the MMS receipt confirmation according to a corresponding relationship and sending the MMS receipt confirmation to the Recipient-MMSC;

taking, by the Recipient-MMSC, the receipt of the MMS receipt confirmation as a charging point.

A method for a WAP-GW implementing MMS charging includes:

receiving an MMS receipt confirmation containing an MSISDN of a receiver;

determining a Recipient-MMSC that corresponds to the MSISDN of the receiver contained in the MMS receipt confirmation according to a corresponding relationship;

sending the MMS receipt confirmation to the Recipient-MMSC.

A WAP-GW for implementing MMS charging is used for receiving an MMS receipt confirmation including an MSISDN of a receiver, determining a Recipient-MMSC that corresponds to the MSISDN of the receiver contained in the MMS receipt confirmation according to a corresponding relationship, and sending the MMS receipt confirmation to the Recipient-MMSC.

DETAILED DESCRIPTION OF THE INVENTION

Figure 1:
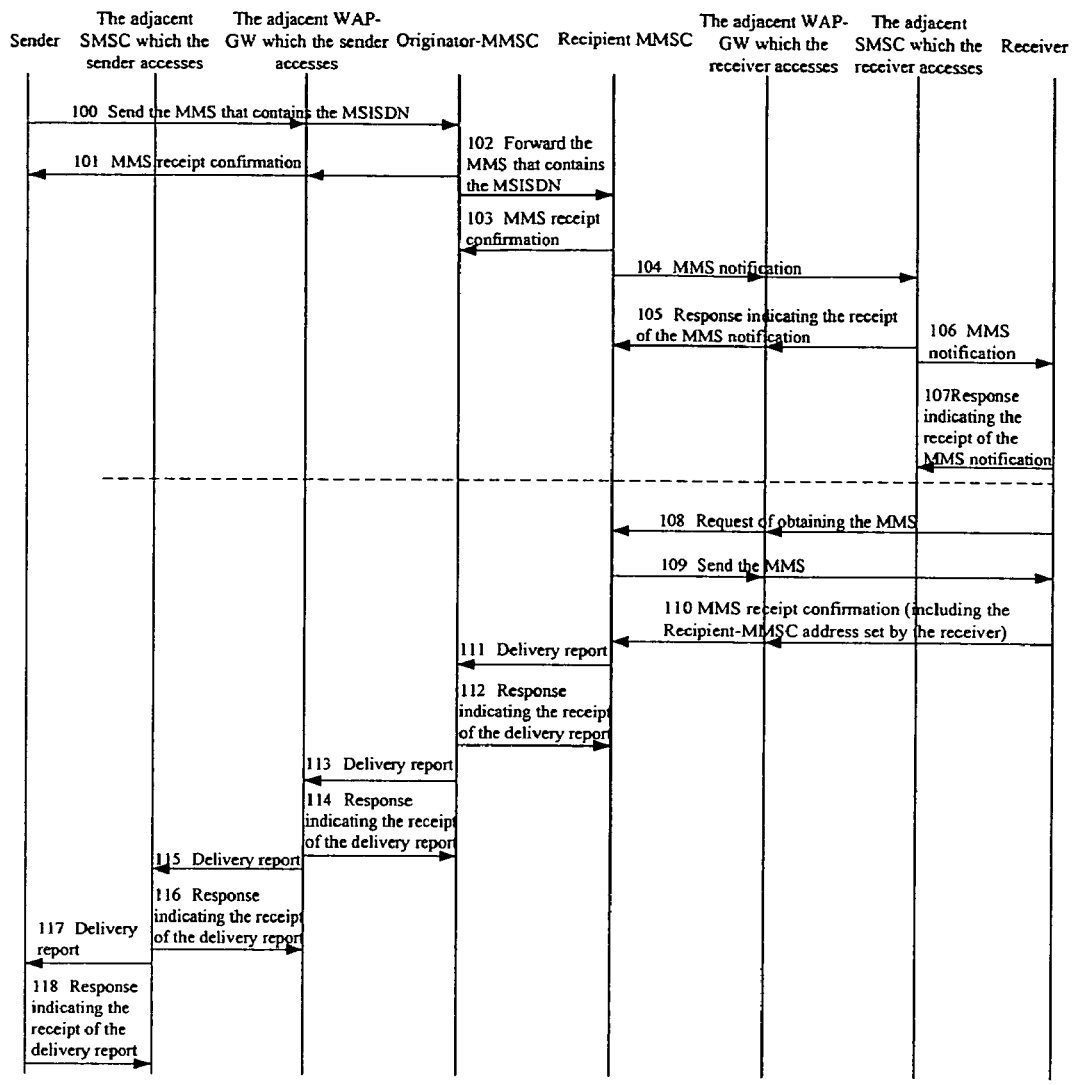
FIG. 1 is a flow chart of the method in the related art in which a receiver delays the receipt of an MMS.

The invention is hereinafter further described in details with reference to the accompanying drawing as well as embodiments so as to make technical solution and merits thereof more apparent.

In an embodiment of the present invention a corresponding relationship between an MSISDN of a receiver and a Recipient-MMSC that sends an MMS to the receiver is set in an adjacent WAP-GW which the receiver accesses, and thus the adjacent WAP-GW which the receiver accesses can determine the Recipient-MMSC that corresponds to the receiver having the MSISDN according to the corresponding relationship which can be set in advance.

Different receivers have different MSISDNs, and different MSISDNs may correspond to the same Recipient-MMSC that sends MMSs to the receivers.

In the embodiment of the present invention, when the receiver sends an MMS receipt confirmation, an information identification of the MMS is included in the confirmation to identify the message sent by the receiver as an MMS receipt confirmation. The receiver sends the MMS receipt confirmation including the information identification of the MMS to the adjacent WAP-GW which the receiver accesses. Once the adjacent WAP-GW which the receiver accesses deems that the message is the MMS receipt confirmation according to the information identification of the MMS contained in the message, the WAP-GW determines the Recipient-MMSC that corresponds to the MSISDN of the receiver that sends the confirmation according to the set corresponding relationship, and sends the confirmation to the determined Recipient-MMSC.

If the adjacent WAP-GW which the receiver accesses receives from the receiver the message that does not contain the information identification of the MMS, the adjacent WAP-GW which the receiver accesses determines that the message sent by the receiver is not the MMS receipt confirmation and just transmits the message sent by the receiver transparently.

In the embodiment of the present invention, the Recipient-MMSC's receiving the MMS receipt confirmation is taken as a trigger point for charging for the MMS sent and the MMS receipt confirmation is not sent to the Recipient-MMSC at the Recipient-MMSC address set by the receiver itself. Therefore, in accordance with the method provided by the embodiment of the present invention, the sender will not be charged when the receiver fails to receive the MMS. Furthermore, in accordance with the method provided by the embodiment of the present invention, the Recipient-MMSC that sends the MMS to the receiver will not miss the MMS receipt confirmation when the receiver alters the address of the Recipient-MMSC, so the Recipient-MMSC that sends the MMS to the receiver will not falsely deem that the receiver fails to receive the MMS, neither the Recipient-MMSC fail to generate a CDR of the MMS and make it impossible to charge the sender of the MMS just because the MMS receipt confirmation is not received within a preset period of time. Hence the problem that the sender evades the payment when the receiver receives the MMS is prevented.

Figure 2:
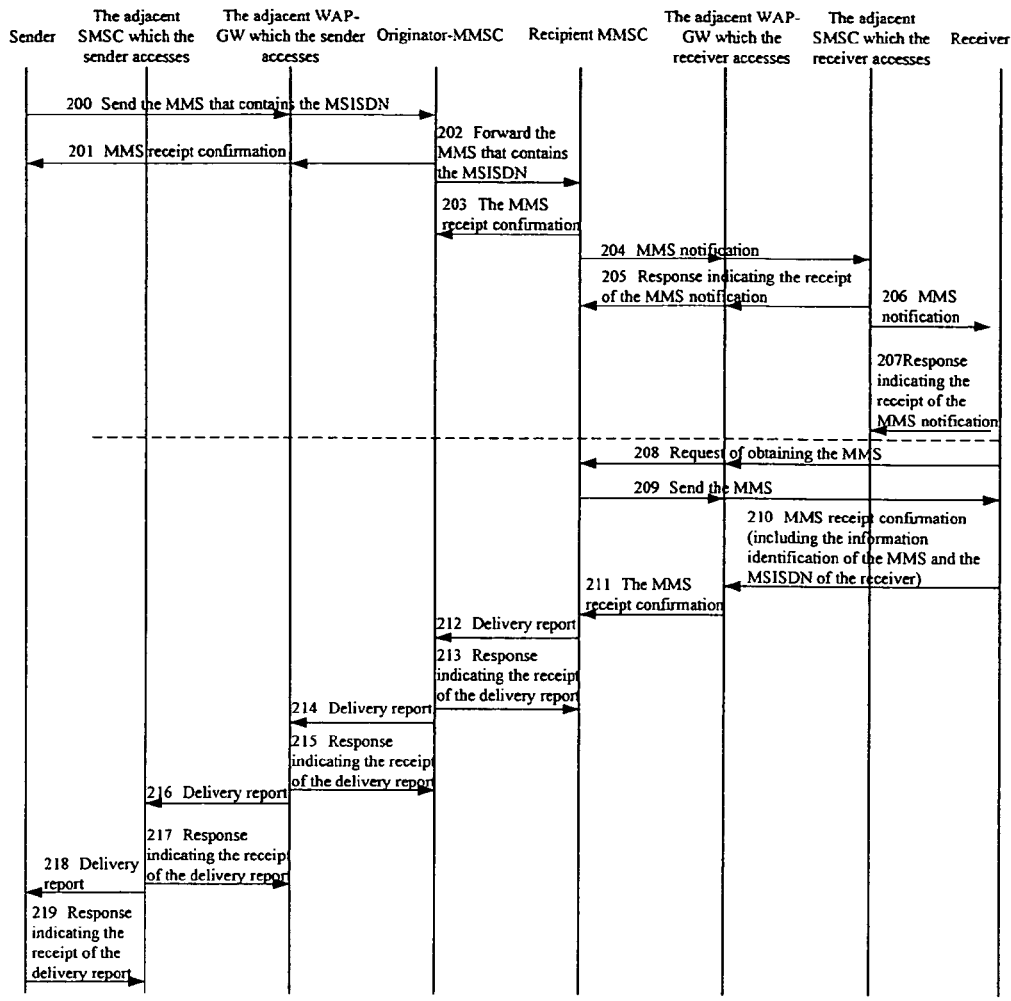
FIG. 2 is a flow chart of the method provided by an embodiment of the present invention in which a receiver delays the receipt of an MMS.

FIG. 2 shows a flow chart of the method for delaying the receipt of an MMS by a receiver in the embodiment of the present invention. The system that implements the transmission of the MMS includes a sender, an adjacent SMSC which the sender accesses, an adjacent WAP-GW which the sender accesses, an Originator-MMSC, a Recipient MMSC, an adjacent WAP-GW which the receiver accesses, an adjacent SMSC which the receiver accesses, and a receiver. The transmission of an MMS includes:

Step 200: the sender transmits an MMS transparently to the Originator-MMSC through the adjacent WAP-GW which the sender accesses; the MMS contains an MSISDN of the receiver;

Step 201: upon the receipt of the MMS, the Originator-MMSC transmits an MMS receipt confirmation transparently to the sender through the adjacent WAP-GW which the sender accesses;

Step 202: the Originator-MMSC determines the Recipient-MMSC according to the MSISDN of the receiver contained in the MMS and forwards the MMS which contains the MSISDN of the receiver to the determined Recipient-MMSC;

Step 203: upon the receipt of the MMS, the Recipient-MMSC sends an MMS receipt confirmation to the Originator-MMSC;

Step 204: the Recipient-MMSC stores the MMS, determines the adjacent SMSC which the receiver accesses and the receiver according to the MSISDN of the receiver contained in the MMS, and transmits an MMS notification transparently to the adjacent SMSC which the receiver accesses through the adjacent WAP-GW which the receiver accesses; the MMS notification contains the address of the Recipient-MMSC which stores the MMS;

Step 205: upon the receipt of the MMS notification, the adjacent SMSC which the receiver accesses returns a response indicating the receipt of the MMS notification through the adjacent WAP-GW which the receiver accesses to the Recipient-MMSC at the Recipient-MMSC address contained in the MMS notification;

Step 206: the SMSC which the receiver accesses sends the MMS notification which contains the address of the Recipient-MMSC that stores the MMS to the receiver;

Step 207: upon the receipt of the MMS notification, the receiver returns a response indicating the receipt of the MMS notification to the adjacent SMSC which the receiver accesses;

Step 208: when the receiver wants to obtain the MMS, the receiver determines the Recipient-MMSC that stores the MMS according to the Recipient-MMSC address contained in the MMS notification, and transmits a request for obtaining the MMS transparently through the adjacent WAP-GW which the receiver accesses;

Step 209: upon the receipt of the request, the Recipient-MMSC transmits the MMS stored transparently to the receiver through the adjacent WAP-GW which the receiver accesses;

Step 210: the receiver of the MMS sends an MMS receipt confirmation to the adjacent WAP-GW which the receiver accesses; the confirmation is an M-Ackowledge.ind message that contains the information identification of the MMS and the MSISDN of the receiver;

Step 211: the adjacent WAP-GW which the receiver accesses determines that the message is the MMS receipt confirmation according to the information identification of the MMS contained in the MMS receipt confirmation; then the WAP-GW determines the Recipient-MMSC that corresponds to the receiver's MSISDN in the message according to the set corresponding relationship and transmits the MMS receipt confirmation transparently to the determined Recipient-MMSC;

Step 212: upon the receipt of the MMS receipt confirmation, the Recipient-MMSC judges whether the MMS is successfully received by the receiver with the related art according to the content of the confirmation, and sends the delivery status in a delivery report to the Originator-MMSC; the receipt of the MMS receipt confirmation by the Recipient-MMSC may be taken as a charging point;

Step 213: the Originator-MMSC returns a response to the Recipient-MMSC indicating the receipt of the delivery report;

Step 214: the Originator-MMSC sends the delivery report obtained to the adjacent WAP-GW which the sender accesses;

Step 215: the adjacent WAP-GW which the sender accesses returns a response to the Originator-MMSC indicating the receipt of the delivery report;

Step 216: the adjacent WAP-GW which the sender accesses forwards the delivery report obtained to the adjacent SMSC which the sender accesses;

Step 217: the adjacent SMSC which the sender accesses returns a response to the adjacent WAP-GW which the sender accesses indicating the receipt of the delivery report;

Step 218: the adjacent SMSC which the sender accesses forwards the delivery report obtained to the sender;

Step 219: the sender returns a response to the adjacent SMSC which the sender accesses indicating the receipt of the delivery report.

If the receiver obtains the MMS immediately upon the receipt of the MMS notification instead of delaying the receipt of the MMS, Step 207 above will not be necessary, and the adjacent SMSC which the receiver accesses forwards the MMS notification directly to the receiver upon the receipt of the notification; the receiver then transmits a request for obtaining the MMS transparently to the Recipient-MMSC through the adjacent WAP-GW which the receiver accesses upon the receipt of the notification, and Step 209 to Step 219 are performed, where the MMS receipt confirmation sent by the receiver in Step 210 is an M-NotifyResp.ind message which contains the information identification of the MMS and the MSISDN of the receiver.

In the embodiment of the present invention, the M-NotifyResp.ind message or the M-Ackowledge.ind message may be contained in a PUSH mode of WTP/HTTP protocol, and the information identification of the MMS is included in the header of the M-NotifyResp.ind message or the M-Ackowledge.ind message; in other words, an application/vnd.Wap.mms-message will be set in the header of the M-NotifyResp.ind message or M-Ackowledge.ind message. When receiving an M-NotifyResp.ind message or M-Ackowledge.ind message, the adjacent WAP-GW which the receiver accesses judges whether an application/vnd.Wap.mms-message is included in the header of the M-NotifyResp.ind message or M-Ackowledge.ind message; if the application/vnd.Wap.mms-message is included, the adjacent WAP-GW which the receiver accesses, according to the set corresponding relationship, determines the Recipient-MMSC that corresponds to the MSISDN of the receiver that sends the M-NotifyResp.ind message or M-Ackowledge.ind message, and sends the M-NotifyResp.ind message or M-Ackowledge.ind message to the determined Recipient-MMSC instead of the Recipient-MMSC at the Recipient-MMSC address set by the receiver itself; otherwise the adjacent WAP-GW which the receiver accesses processes the M-NotifyResp.ind message or M-Ackowledge.ind message according to the related art.

In the embodiment of the method provided by the present invention the Recipient-MMSC's receiving the MMS receipt confirmation in Step 212 is taken as an trigger point for charging, both the Recipient-MMSC and Originator-MMSC generate the CDRs and the sender is charged according to the CDRs.

The foregoing description is only a preferred embodiment of this invention and is not for use in limiting the protection scope thereof. All the modifications, equivalent replacements or improvements in the scope of the present invention's sprit and principles shall be included in the protection scope of the present invention.

What is claimed is:

1. A method for charging Multimedia Message Service (MMS), comprising:
    sending, by a receiver, an MMS receipt confirmation including a Mobile Station International Integrated Services Digital Network Number (MSISDN) of the receiver to an adjacent Wireless Application Protocol Gateway (WAP-GW) which the receiver accesses upon the receipt of the MMS;
    determining, by the adjacent WAP-GW which the receiver accesses, a Recipient Multimedia Message Service Center (Recipient-MMSC) that corresponds to the MSISDN of the receiver included in the MMS receipt confirmation according to a corresponding relationship and sending the MMS receipt confirmation to the Recipient-MMSC;
    taking, by the Recipient-MMSC, the receipt of the MMS receipt confirmation as a charging point.

2. The method of claim 1, further comprising:
    judging, by the adjacent WAP-GW which the receiver accesses, whether the received message is an MMS receipt confirmation, if yes, performing the process of determining the Recipient-MMSC; otherwise transparently transmitting the received message directly.

3. The method of claim 2, wherein the MMS receipt confirmation further includes an information identification of the MMS; and the process of judging whether the received message is an MMS receipt confirmation comprises:
    judging, by the adjacent WAP-GW which the receiver accesses, whether the received message includes the information identification of the MMS, if yes, the message is the MMS receipt confirmation.

4. The method of claim 1, wherein the MMS receipt confirmation is an M-Ackowledge.ind message when the receiver delays the receipt of the MMS, or an M-NotifyResp.ind message when the receiver performs immediately the receipt of the MMS.

5. The method of claim 4, wherein the M-Ackowledge.ind message or the M-NotifyResp.ind message includes the information identification of the MMS in the header; and before the process of determining the Recipient-MMSC, the method further comprises:
    judging, by the adjacent WAP-GW which the receiver accesses, whether the received message is an MMS receipt confirmation according to whether the received message includes the information identification of the MMS in the header; if yes, performing the process of determining the Recipient-MMSC; otherwise transparently transmitting the received message directly.

6. The method of claim 5, wherein the included information identification of the MMS is an application/vnd.Wap.mms-message.

7. The method of claim 4, wherein the M-Ackowledge.ind message or the M-NotifyResp.ind message is transmitted in a PUSH mode of the Wireless Transmission Protocol/Hyper Text Transmission Protocol (WTP/HTTP).

8. The method of claim 1, wherein the corresponding relationship between the MSISDN of the receiver and the Recipient-MMSC which sends an MMS to the receiver is set by the adjacent WAP-GW which the receiver accesses.

9. The method of claim 8, wherein the corresponding relationship comprises the corresponding relationship between MSISDNs of more than one receivers and one Recipient-MMSC.

10. A method for a Wireless Application Protocol Gateway (WAP-GW) implementing Multimedia Message Service (MMS) charging, comprising:
    receiving, by a WAP-GW, an MMS receipt confirmation including an MSISDN of a receiver;
    determining, by the WAP-GW, a Recipient-MMSC that corresponds to the MSISDN of the receiver included in the MMS receipt confirmation according to a corresponding relationship;
    sending, by the WAP-GW, the MMS receipt confirmation to the Recipient-MMSC.

11. The method of claim 10, wherein the corresponding relationship is set between the MSISDN of the receiver and the Recipient-MMSC which sends the MMS to the receiver.

12. The method of claim 11, wherein the corresponding relationship comprises the corresponding relationship between MSISDNs of more than one receivers and one Recipient-MMSC.

13. The method of claim 10, further comprising:
    judging whether the received message is an MMS receipt confirmation; if yes, performing the process of determining the Recipient-MMSC; otherwise transparently transmitting the received message directly.

14. The method of claim 13, wherein the MMS receipt confirmation further includes an information identification of the MMS; and the process of judging whether the received message is an MMS receipt confirmation comprises:
    judging whether the received message includes the information identification of the MMS; if yes, the message is the MMS receipt confirmation.

15. The method of claim 10, wherein the MMS receipt confirmation is an M-Ackowledge.ind message when the receiver delays the receipt of the MMS, or an M-NotifyResp.ind message when the receiver performs immediately the receipt of the MMS.

16. The method of claim 15, wherein the M-Ackowledge.ind message or the M-NotifyResp.ind message includes the information identification of the MMS in the header; and before the process of determining the Recipient-MMSC, the method further comprises:
    judging whether the received message is an MMS receipt confirmation according to whether the received message includes the information identification of the MMS in the header; if yes, performing the process of determining the Recipient-MMSC; otherwise transparently transmitting the received message directly.

17. The method of claim 16, wherein the included information identification of the MMS is an application/vnd.Wap.mms-message.

18. The method of claim 15, wherein the M-Ackowledge.ind message or the M-NotifyResp.ind message is transmitted in a PUSH mode of the Wireless Transmission Protocol/Hyper Text Transmission Protocol (WTP/HTTP).

19. A Wireless Application Protocol Gateway (WAP-GW) for implementing Multimedia Message Service (MMS) charging, wherein the WAP-GW is used for receiving an MMS receipt confirmation including an MSISDN of a receiver, determining a Recipient-MMSC that corresponds to the MSISDN of the receiver included in the MMS receipt confirmation according to a corresponding relationship, and sending the MMS receipt confirmation to the Recipient-MMSC.

20. The WAP-GW of claim 19, wherein the WAP-GW sets the corresponding relationship between the MSISDN of the receiver and the Recipient-MMSC that sends an MMS to the receiver.

21. The WAP-GW of claim 19, wherein the WAP-GW is further used for judging whether the received message is an MMS receipt confirmation; if yes, performing the step of determining the Recipient-MMSC; otherwise transparently transmitting the received message directly.

22. The WAP-GW of claim 21, wherein the MMS receipt confirmation further includes an information identification of the MMS; and the WAP-GW is further used for judging whether the received message includes the information identification of the MMS; if yes, the message is the MMS receipt confirmation.

* * * * *